United States Patent Office 2,897,234
Patented July 28, 1959

2,897,234

ANTIBIOTIC PURIFICATION

Bernard Heinemann, East Syracuse, and Irving R. Hooper, Fayetteville, N.Y., assignors to Bristol Laboratories Inc., Syracuse, N.Y., a corporation of New York No Drawing. Application April 18, 1956
Serial No. 578,872

1 Claim. (Cl. 260—559)

This invention is concerned with novel and useful methods for the purification of tetracycline and relates more particularly to methods for its recovery in purified form from solid materials or solutions of such materials containing both tetracycline and chlortetracycline.

This application is a continuation-in-part of our prior co-pending application Serial No. 432,388, filed May 26, 1954, now abandoned.

The useful broad spectrum antibiotic, tetracycline, has been obtained by catalytic deschlorination of chlortetracycline according to Conover, U.S. Patent 2,699,054.

Tetracycline, often admixed with chlortetracycline, is also obtained by fermentation of Streptomyces aureofaciens or streptomyces viridifaciens e.g. according to U.S. Patents 2,712,517, 2,734,018 and 2,739,924 and according to Bohonos et al., Antibiotics Annual, 1953–4, pages 49–55. The usual processes for the recovery of tetracycline from a fermentation broth which contains both tetracycline and chlortetracycline yield solid products containing these two antibiotics in substantially the same ratio as they occur in the fermentation broth. Their chemical and physical properties are so similar as to make it extremely difficult to remove the undesired chlortetracycline by a method suitable for commercial use as opposed to purely laboratory methods such as the use of Craig countercurrent distribution. Such purification is, of course, essential before tetracycline can be marketed for therapeutic use.

The object of the present invention is to provide improved methods of removing contaminating amounts of chlortetracycline from tetracycline which are suitable for commercial use.

In accordance with the present invention there is provided the process of recovering substantially chlortetracycline-free tetracycline from a solid mixture of tetracycline and chlortetracycline which comprises slurrying said solid mixture in a minimal amount of aqueous acid of about pH 2.5, using no less than 0.1 milliliter of aqueous acid per milligram of chlortetracycline, until substantially all of said chlortetracycline has dissolved, and then collecting the purified, solid, undissolved tetracycline.

After the completion of a fermentation to produce a broth containing a mixture of tetracycline and chlortetracycline, tetracycline is recovered from the broth, for example, by filtering to remove the mycelium (preferably at about pH 2.0), stirring the broth (preferably at about pH 8.5) with butanol or methyl isobutyl ketone, separating the solvent layer containing the tetracyclines, concentrating it to small volume by distillation, and simply cooling, or mixing it with a liquid lower aliphatic hydrocarbon, e.g., Skellysolve C, to precipitate solid, mixed tetracyclines.

In another process the crude tetracycline is recovered from the fermentation broth by an alkaline precipitation. Fundamentally, the fermentation broth is adjusted to an alkaline pH in the range of 8 to 11 inclusive and the precipitated mixture of mycelium (mat) and tetracycline is collected by filtration. As a variant of this process, the fermentation broth is acidified to less than pH 3, filtered to remove the mycelium, and the filtrate is treated as above, that is it is adjusted to an alkaline pH in the range of 8 to 11 inclusive and the precipitate of crude tetracycline is collected by filtration. Any water soluble alkali of sufficient strength is used, ammonia or sodium hydroxide are preferred. The pH is adjusted to the range of 8 to 11 inclusive; an alkaline pH in the range of 9 to 10 is preferred. The precipitate of tetracycline, with or without accompanying mycelium, is brought into solution for further manipulation as desired according to any of the procedures disclosed herein by solution in aqueous acid below pH 3 or in aqueous alkali above pH 11. Examples of such aqueous acids include water-soluble acids furnishing the desired pH, e.g. hydrochloric acid, sulfuric acid, phosphoric acid and nitric acid. These same acids are effective in lowering the pH of fermentation broth below pH 3, and preferably to about pH 2.0–2.5, to permit separation of tetracycline, which is in solution as an acid addition salt, from the solid mycelium by filtration before use of the alkaline precipitation described above.

Tetracycline is converted to tetracycline salts by dissolving the base in dry acetone or n-propanol and adding the anhydrous acid, i.e., hydrogen chloride gas, sulfuric acid, sulfuric acid in dry acetone, phosphoric acid, tartaric acid, citric acid, nitric acid in dry methyl isobutyl ketone, and collecting by filtration the salt which precipitates, e.g., tetracycline hydrochloride or the sulfate, phosphate, tartrate, citrate, etc.

In another procedure for the recovery of a mixture of tetracycline and chlortetracycline from a fermentation broth, there is added to the fermentation broth 0.1% $CaCl_2$, and the broth is adjusted to about pH 8.5–9.0 with caustic, e.g. soda or potash, or ammonia and then extracted with n-butanol, using $\frac{1}{2}$ volume for batchwise extraction or $\frac{1}{4}$–$\frac{1}{5}$ volume for multiple stage extraction. The mixture is filtered and the butanol phase is separated if batchwise procedure is used. The tetracycline-containing butanol is concentrated to $\frac{1}{200}$ of the original broth volume by distillation in vacuo. The butanol concentrate and any insolubles therein are extracted with three successive equal volumes of water adjusted to pH 2.5 with hydrochloric acid. These aqueous extracts are combined, filtered and concentrated by distillation in vacuo to $\frac{1}{400}$–$\frac{1}{500}$ broth volume. To this aqueous concentrate is added 1% calcium chloride (w./v.) and the pH is adjusted to about 7.8–8.5 by the addition of ammonium hydroxide. The resulting precipitate of solid crude calcium tetracycline is collected by filtration and dried with an acetone wash and air or vacuum drying.

A very simple, inexpensive and efficient method of isolating crude solid tetracycline from large volumes of fermentation broth is furnished by the following procedure. A fermentation broth containing at least 250 mcg./ml. tetracycline, and preferably 1000 mcg./ml. tetracycline, or more, is adjusted to an acid pH and the mycelium is removed by filtration. The filtered broth is then adjusted to pH 8 or higher by the addition of caustic, e.g. soda, or ammonia. Crude, active, solid tetracycline precipitates as the free base or calcium salt, contaminated with calcium phosphates and other impurities, and is collected by filtration.

Tetracycline is efficiently purified of contaminating amounts of chlortetracycline, when such are present, by slurrying in aqueous acid of substantially pH 2.5, which dissolves only the chlortetracycline. The preferred acid is hydrochloric acid; other acids, e.g. sulfuric acid, phosphoric acid, may be used, however, provided the requisite pH is obtained. Tetracycline base or salt is slurried in hydrochloric acid sufficient to provide a pH of 2.5 or, as is preferred, impure tetracycline base or salt, e.g. hydrochloride, is dissolved in aqueous acid at pH 1.5 or less and sufficient base, e.g. ammonium hydroxide, sodium hydroxide, is added to provide a pH of 2.5. The amount of tetracycline used is not a limiting factor; in general it is convenient to use 50 to 100 mgms. tetracycline base or salt per milliliter of water acidified to pH 2.5 with hydrochloric acid. The pH is a critical factor; substantially pH 2.5 is preferred although any pH in the range 2.0–3.5 is useful. The amount of chlortetracycline present as an impurity in tetracycline to be purified by this procedure, should not exceed 9 mgms./ml. of acidified water and preferably should be less than 5mgm./ml.; this limit is easily observed by increasing when necessary the amount of acid water used for slurrying. Such solids, e.g. tetracycline hydrochloride and chlortetracycline hydrochloride, in this purification are thus mixed, i.e., slurried, in water acidified with hydrochloric acid to substantially pH 2.5 for a considerable period of time, e.g. sixteen hours, sufficient to permit the chlortetracycline to dissolve. This is determined by simple test. The purified, solid tetracycline base which remains undissolved is then collected by filtration.

Further understanding of the present invention is provided by the following examples which will serve for purposes of illustration, but not of limitation.

*Example I*

Tetracycline hydrochloride (10 g.) assaying 830 mcg./mgm. tetracycline and 171 mcg./mgm. chlortetracycline (83% tetracycline) by the differential ultra-violet absorption method and containing about 10% chlortetracycline as determined by paper strip chromatography, was slurried for sixteen hours in 200 ml. water adjusted to about pH 2.5 with hydrochloric acid. The solid, purified tetracycline base was then collected by filtration, dried, found to weigh 8.0 grams, to assay 901 mcg./mgm. tetracycline and 39 mcg./mgm. chlortetracycline (96% tetracycline) by the differential ultra-violet absorption method and to contain 95–97% tetracycline as determined by paper-strip chromatography. The recovery of tetracycline was 87%.

*Example II*

An experiment similar to that of Example I was conducted under nitrogen and gave a 92% recovery of tetracycline base containing from zero to three percent chlortetracycline, potency 929 mcg./mgm.

Quantitative analysis of mixtures of tetracycline and chlortetracycline is carried out according to the procedures in the literature, e.g. Antibiotic Annual, 1953–1954, pages 54 and 55 and pages 81–87; Minieri et al., U.S. Patent 2,734,018.

We claim:

The process of recovering substantially chlortetracycline-free tetracycline from a solid mixture of tetracycline and chlortetracycline which comprises slurrying said solid mixture in a minimal amount of aqueous mineral acid of about pH 2.5, using no less than 0.1 milliliter of aqueous acid per milligram of chlortetracycline, until substantially all of said chlortetracycline has dissolved and for at least about sixteen hours, and then collecting the purified, solid, undissolved tetracycline.

References Cited in the file of this patent

FOREIGN PATENTS

583/55   Union of South Africa ____ Sept. 14, 1955